United States Patent
Kuroki et al.

(10) Patent No.: US 6,556,892 B2
(45) Date of Patent: Apr. 29, 2003

(54) CONTROL DEVICE AND CONTROL METHOD FOR ROBOT

(75) Inventors: Yoshihiro Kuroki, Kanagawa (JP); Tatsuzo Ishida, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/980,137

(22) PCT Filed: Apr. 3, 2001

(86) PCT No.: PCT/JP01/02894
§ 371 (c)(1),
(2), (4) Date: Mar. 19, 2002

(87) PCT Pub. No.: WO01/74549
PCT Pub. Date: Oct. 11, 2001

(65) Prior Publication Data
US 2002/0120361 A1 Aug. 29, 2002

(30) Foreign Application Priority Data
Apr. 3, 2000 (JP) ......................................... 2000-100795

(51) Int. Cl.⁷ ............................................. G05B 19/00
(52) U.S. Cl. .................. 700/245; 700/95; 700/108; 700/110; 700/186; 700/193; 901/23; 901/29; 701/23; 702/712
(58) Field of Search ............................. 700/95, 108, 110, 700/163, 186, 193, 245; 701/23; 901/23, 29; 318/568.12, 568.22, 567, 568.1, 568.11; 702/712

(56) References Cited

U.S. PATENT DOCUMENTS 6,438,454 B1 * 8/2002 Kuroki ....................... 700/245
6,472,839 B1 * 10/2002 Ishii et al. ............. 318/568.12
6,493,606 B2 * 12/2002 Saijo et al. ................. 700/245

FOREIGN PATENT DOCUMENTS

| JP | 4-317105 | 11/1992 |
|----|----------|---------|
| JP | 5-241811 | 9/1993 |
| JP | 6-195162 | 7/1994 |
| JP | 7-104778 | 4/1995 |
| JP | 7-129220 | 5/1995 |
| JP | 2000-6068 | 1/2000 |

OTHER PUBLICATIONS

Luo et al., The development of intelligent control system for animal robot using multisensor fusion, 2001, IEEE, pp. 1–6.*
Yoshihiro, A small biped entertainment robot, 2001, IEEE, pp. 3–4.*
Ali et al., Implementing schema–thoretic models of animal behavior in robotic systems, no date, Internet, pp. 1–8.*

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer (57) ABSTRACT

A controlling apparatus for a robot of the type formed by a plurality of joint actuators and operating in accordance with a behavioral schedule comprises a behavior scheduling unit for setting a robot's behavioral schedule, an operation controller for implementing an operational pattern corresponding to the behavioral schedule as determined by the behavior scheduling unit by driving each joint actuator, a detector for detecting the state of operation implementation by the operation controller and a recording unit for recording a log including the behavioral schedule by the behavior scheduling unit and the state of operation implementation by the detector. A user issuing a command for the robot is authenticated and the contents of the command supplied from the user are recorded in combination with the behavior taken by the robot responsive to the command and the time point of implementation of the behavior.

12 Claims, 8 Drawing Sheets

| TIME | USER AUTHENTICATION INFORMATION | CONTENTS OF DIALOG | BEHAVIOR SCHEDULE | BEHAVIORAL MODE | RESULT OF BEHAVIOR RESULT OF SELF-DIAGNOSIS |
|---|---|---|---|---|---|

CONTROL DEVICE AND CONTROL METHOD FOR ROBOT

TECHNICAL FIELD

This invention relates to a robot operating in accordance with a behavioral schedule and, in particular, it relates to a behavior schedule setting type robot which sets a behavioral schedule by interaction with a user based on inputting of the speech or an image or autonomously without recourse to user inputs. More specifically, it relates to a behavior schedule setting type robot which is able to check for a cause of abnormalities, malfunctions or troubles if such should occur during the period of "dialogue driving" or "autonomous driving".

BACKGROUND ART

A mechanical apparatus for performing movements simulating the movement of the human being using electrical or magnetic operation is termed a "robot". The etymology of the term robot is said to be "ROBOTA" (slave machine) of the Slavic language. The robots started to be used extensively towards the end of sixtieth. Most of the robots used were industrial robots, such as manipulators or transporting robots, aimed at automating or performing unmanned operations in plant operations.

The standstill type robot, installed and used at a fixed place, such as armed robots, are in operation only in a stationary or local working space such as for assembling or sorting of component parts. On the other hand, the mobile robots are not limited as to working space and are movable on a preset or undefined path in an unrestricted fashion to perform operations to take the place of human operators or to offer variegated services to take the place of the human being, dogs or other living organisms. The legged mobile robots, while being unstable and difficult to control as to its orientation or walking, as compared to crawler or tire type robots, are superior in climbing up and down a ladder or a staircase, in riding over obstacles or walking or running flexibly on leveled or unleveled terrain.

In recent years, researches and development in legged mobile robots, including pet type robots, simulating the bodily mechanism or movements of animals, such as quadruples, e.g., dogs or cats, or so-called humanoid robots, simulating the bodily mechanism or movements of animals erected and walking on feet, such as human being, are progressing, and expectations may be made of practical utilization of these robot types.

One usage of the legged mobile robot is taking the place of human operators in a variety of difficult operations in industrial and productive activities, such as, for example, taking the place of the human operators in maintenance operations in nuclear power plants, thermal power generation plants or in petrochemical plants, transport and assembly operations in manufacturing plants, cleaning in high-rise buildings or rescue on the sites of conflagration.

Another usage of the legged mobile robot is the living coherent type usage, rather than the aforementioned operation substitution type usage, that is the usage for "co-living" with the human being. This type of the robot emulates the behavioral mechanism or the feeling expression of the animal of a higher intellect, walking on legs, such as human being or dogs kept as pets. This type of the robot is also required not only to implement previously input behavior patterns faithfully, but also to realize expressions vivid actions responsive to the speech or demeanor of the user, such as praising, scolding, or hitting.

The conventional toy machines are fixed as to the relation between a user operation and a responsive operation, such that the movement of a toy cannot be changed to the user's liking. The result is that the user is tired of the toy, doing nothing but repeating the same operations, sooner or later.

Conversely, an intelligent robot implements intellectual operations, in accordance with a chronological model of the operation generation, in addition to doing autonomous thinking control and autonomous control of actions. Moreover, the robot, equipped with an image inputting device or a speech input/output device and doing image or speech processing, is able to perform the realistic communication with the human being at a higher intellectual level. The intelligent robot is responsive to detection of a stimulus from outside, such as user actuation, to change the chronological model. That is, by affording the "learning effect" such a behavior pattern may be provided which is adapted to the taste of the user and hence is not tiresome to the user. Moreover, the user is able to enjoy a sort of the inculcation simulation with a game feeling.

In the case of a robot dedicated to a special industrial usage, it is sufficient if the user or the operator inputs a command for implementation which can be interpreted subsequent unequivocally. This is analogous to the faithful responsive operation of an information processing equipment to a console input of a unique command, such as file copying or deletion, or file opening.

On the other hand, the co-living or entertainment type robot is able to implement "dialogue driving" in which the robot operates on the basis not only of a definitive or unequivocal command from the user but also on more abstract input data, such as speech or image, and "autonomous driving" in which the user operates in accordance with the behavior schedule set by no other than the robot, without recourse to the command from or dialog with the user, that is independently of the user.

However, the higher the degree of freedom in actions or functionality of the robot, such as by causing the robot to interpret abstract user inputs or thinking control proper to the robot, the more difficult it becomes to search into the cause of malfunctions or troubles if such are produced.

In routine machines or apparatus, the response of the apparatus to an input command is subsequent in a one-for-one correspondence, so that it can be determined readily which command input or implemented has caused an abnormality in the apparatus.

Conversely, with the aforementioned "dialogue driving" or "autonomous driving" type robot, in which there is permitted a certain latitude in the interpretation on the part of the robot of the user input or external events, it is difficult to locate the cause of the abnormality or malfunctions. Additionally, since the legged mobile robot can walk in an arbitrary working space without following a fixed route, the user is unable to monitor the robot at all times. Therefore, if, as the robot is put outside the monitoring range by the user, there has occurred a malfunction, or the robot has become involved in troubles or accidents, the user will find it extremely difficult to search what has happened to the robot.

DISCLOSURE OF THE INVENTION

It is an object of the present invention to provide a behavior scheduling type robot that is able to set a behavioral schedule by a dialog with a user based on an input such as speech or image, or that is able to autonomously set a behavioral schedule without recourse to a user input.

It is another object of the present invention to provide a behavior scheduling type robot that is able to search into a cause of abnormalities, malfunctions or troubles in which the robot is involved during "dialog driving" or "autonomous driving".

For accomplishing the above object, the present invention provides a controlling apparatus for a robot of the type formed by a plurality of joint actuators and operating in accordance with a behavioral schedule, including a behavior scheduling unit for setting a robot's behavioral schedule, an operation controller for implementing an operational pattern corresponding to the behavioral schedule as determined by the behavior scheduling unit by driving each joint actuator, a detector for detecting the state of operation implementation by the operation controller, and a recording unit for recording a log including the behavioral schedule by the behavior scheduling unit and the state of operation implementation by the detector.

The controlling apparatus for a robot according to the present invention further includes a user input unit for receiving a command or data from the user, and a dialog management unit for supervising the dialog with the user based on the user input command or data from the user input unit. The behavior scheduling unit may set a behavioral schedule in accordance with the contents of the dialog in the dialog management unit, while the recording unit may take a log of the dialog contents.

The controlling apparatus for a robot according to according to the present invention may further include a self-diagnosis unit for diagnosing each part of the robot. The recording unit may take the log of the results of the self-diagnosis.

The controlling apparatus for a robot according to the present invention may further include a user authentication unit for authenticating a user lying in the vicinity of the robot. The recording unit may take a log of the results of user authentication.

The behavior scheduling unit may be operable in accordance with a first operating system of setting a behavioral schedule based on a dialog with the user or in accordance with a second operating system of setting a behavioral schedule based on a feeling model as determined responsive to external changes. In such case, the recording unit taking a log of an operating system in the behavior scheduling unit.

The robot according to the present invention, is able to search an arbitrary working space routlessly, as a legged mobile robot does. This working space can be co-owned with the living space of the human being. This robot is able to set a behavioral schedule by dialog with the user based on audio or image input or to set a behavioral schedule autonomously without recourse to the user input.

The robot of the present invention is able to authenticate a user who issues a command to the robot, or to extract the face, voice or other biological features of the user who cannot be authenticated. Moreover, the contents of the command issued by the user, the behavior taken by the robot responsive to the command and the time of implementation of the behavior can be combined together and recorded as a sort of the log. The inner state of the robot or the sensor input information can also be recorded together.

The contents of the log can be analyzed later to investigate into the cause of abnormalities, malfunctions or troubles in which the robot is involved.

The history of the robot's actions, such as "what is the action the robot did, when and with whom such action was done", can be searched even during the time other than the time of the abnormalities, malfunctions or troubles. Alternatively, the history of the acts of the robot can be supervised as the empirical information so that the information on "what is the action the robot did, when and with whom such action was done" can be extracted from the dialog between the user and the robot. Such robot is highly entertainment-oriented. In addition, the user can enjoy a sort of an inculcation simulation with the sense of a game.

Other objects, features and advantages of the present invention will become more apparent from reading the embodiments of the present invention as shown in the drawings.

BEST MODE FOR CARRYING OUT THE INVENTION

Referring to the drawings, a robot employing a control apparatus according to the present invention and a control method therefor are explained in detail.

Figure 1:
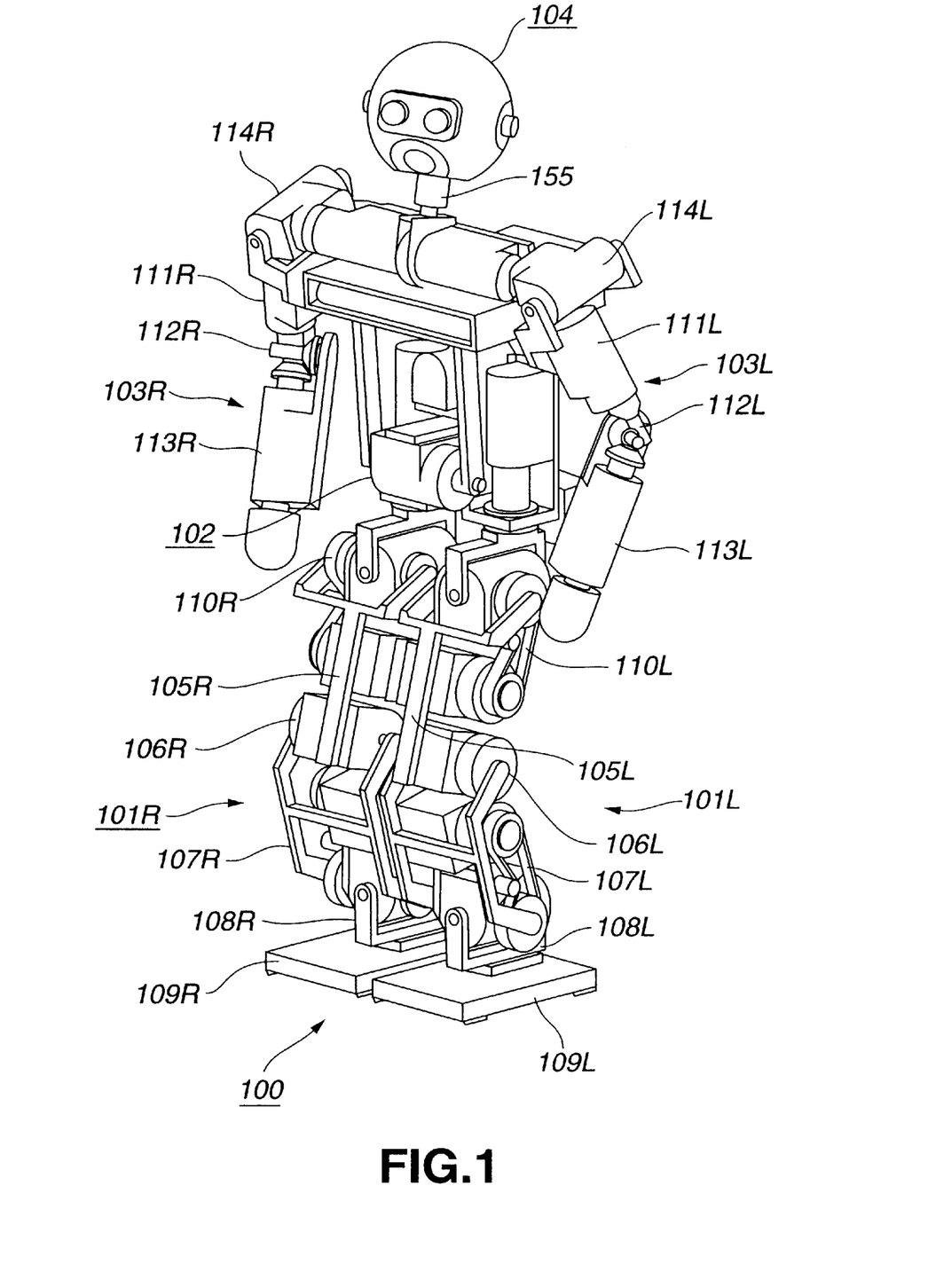
FIG. 1 is a perspective view of a legged mobile robot of the present invention when seen from the front side.
Figure 2:
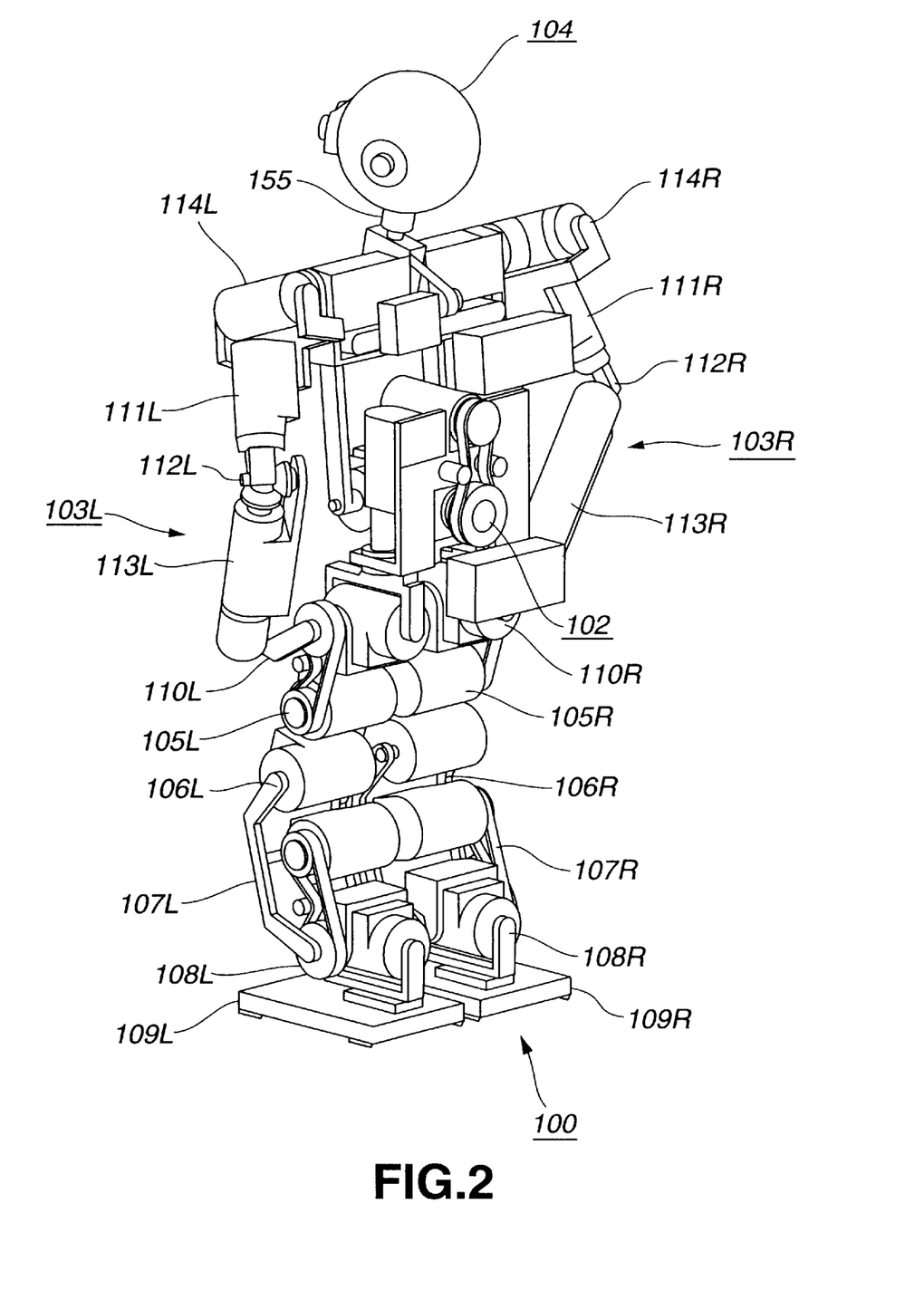
FIG. 2 is a perspective view of the legged mobile robot of the present invention when seen from the back side.

FIGS. 1 and 2 show a legged mobile robot 100 of the present invention, in the erect state, with the robot being seen from the front and back sides, respectively. This legged mobile robot 100 is of the type called "humanoid" and is able to set a behavior schedule through a dialog with a user based on- a speech or video input, or autonomously, without recourse to the user inputs, that is independently of the user, as will be explained subsequently. As shown in FIGS. 1 and 2, the legged mobile robot 100 includes two lower limbs 101R, 101L, responsible for movement on legs, a body trunk 102, left and right upper limbs 103R, 103L and a head 104.

The left and right lower limbs 101R, 101L are made up of thighs 105R, 105L, knee joints 106R, 106L, shins 107R, 107L, ankles 108R, 108L and foot flats 109R, 109L. The left and right lower limbs 101R, 101L are connected by hip joints 110R, 110L at approximately the lowermost points of the body trunk 102. The left and right upper limbs 103R, 103L are made up of upper arms 111R, 111L, knee joints 112R, 112L, and forearms 113R, 113L, and are connected by shoulder joints 114R, 114L at left and right side edges of the body trunk 102. The head 104 is connected by a neck joint 155 to approximately the uppermost center point of the body trunk 102.

Within the body trunk unit is mounted a control unit not shown in FIG. 1 or FIG. 2. This controller is a casing carrying a controller forming a driving control for each joint actuator forming the legged mobile robot 100 and a main controller for processing an exterior input from respective sensors as later explained and peripherals such as power source circuitry. The control unit may include a communication interface or communication device for remote control.

Figure 3:
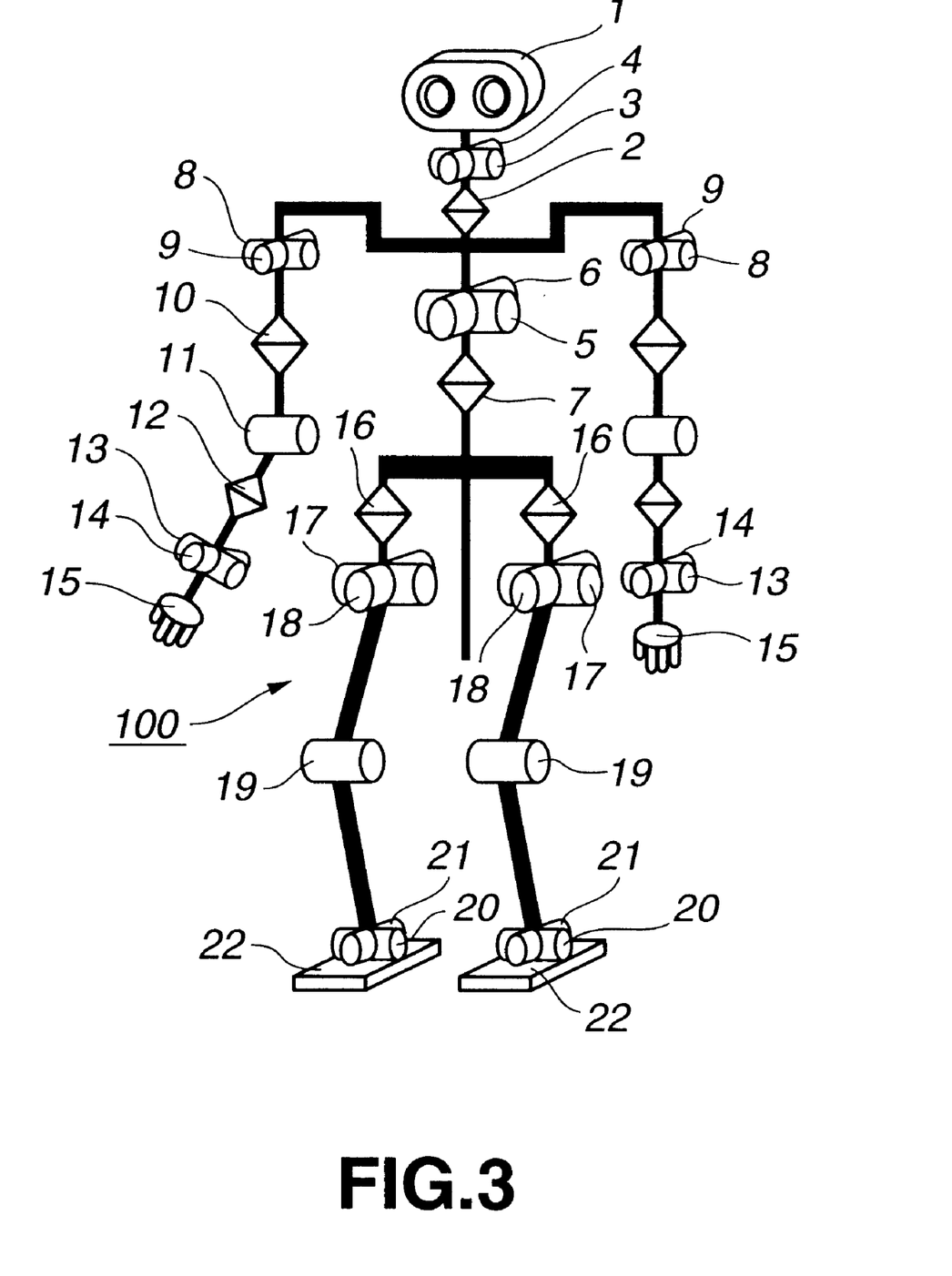
FIG. 3 schematically shows a freedom degree forming model provided in the legged mobile robot of the present invention.

FIG. 3 schematically shows the structure of the degree of joint freedom owned by the legged mobile robot 100 of the present invention. As shown, the legged mobile robot 100 is made up of an upper body portion including two arm and a head 1, a lower limb comprised of two legs for implementing the movement actions, and a body trunk portion interconnecting the upper limb and the lower limb.

The neck joint, supporting the head 1, has three degrees of freedom, namely a neck joint yaw axis 2, a neck joint pitch axis 3 and a neck joint roll axis 4.

Each arm is made up of a shoulder joint pitch axis 8, a shoulder joint roll axis 9, an upper arm yaw axis 10, a hinge joint pitch axis 11, a forearm yaw axis 12, a wrist joint pitch axis 13, a wrist joint roll axis 14 and a hand 15. The hand 15 is, in actuality, a multi-joint multi-freedom structure including plural fingers. It is however assumed that the movement of the hand 15 itself is assumed to have a zero degree of freedom because it contributes to or influences the orientation stability control or walking movement control of the robot 100 only to a lesser extent. Therefore, the left and right arms are assumed to have seven degrees of freedom.

The body trunk portion has three degrees of freedom, namely a body axis pitch axis 5, a body trunk roll axis 6 and a body trunk yaw axis 7.

Left and right legs, forming the lower limb, are each made up of a hip joint yaw axis 16, a hip joint pitch axis 17, a hip joint roll axis 18, a knee joint pitch axis 19, an ankle joint pitch axis 20, an ankle joint roll axis 21 and a foot (foot sole of foot flat). The point of intersection of the hip joint pitch axis 17 and the hip joint roll axis 18 defines a hip joint position of the robot 100 of the present embodiment. Although the foot (foot sole) 22 of the human body is, in effect, a structure including the multi-joint multi-freedom foot sole, the foot sole of the legged mobile robot 100 of the present invention is assumed to be of zero degree of freedom. Thus, the left and right feet are made up of six degrees of freedom.

In sum, the legged mobile robot 100, in its entirety, has 3+7×2+3+6×2=32 degrees of freedom. However, the legged mobile robot 100 is not necessarily limited to the 32 degrees of freedom. The degrees of freedom, that is the number of joints, can, of course, be optionally increased or decreased depending on designing and fabrication constraint or design parameter requirements.

In actuality, the above-described respective degrees of freedom of the legged mobile robot 100 are realized as active movements by joint actuators. From a variety of requirements for eliminating any excess bulging portions in the appearance of the overall device to simulate the shape of the body of the human being, and for exercising orientation control on an unstable structure for realizing walking on two feet, the joint actuators are desirably small-sized and lightweight.

According to the present invention, a small-sized AC servo actuator is used, which is of the type directly coupled to a gearing and which has a one-chip servo control system enclosed in a motor unit. Meanwhile, the small-sized AC servo actuator, applicable to a legged robot, is disclosed in, for example, the specification of the JP Patent Application H-11-33386 transferred to and filed in the name of the present Assignee.

Figure 4:
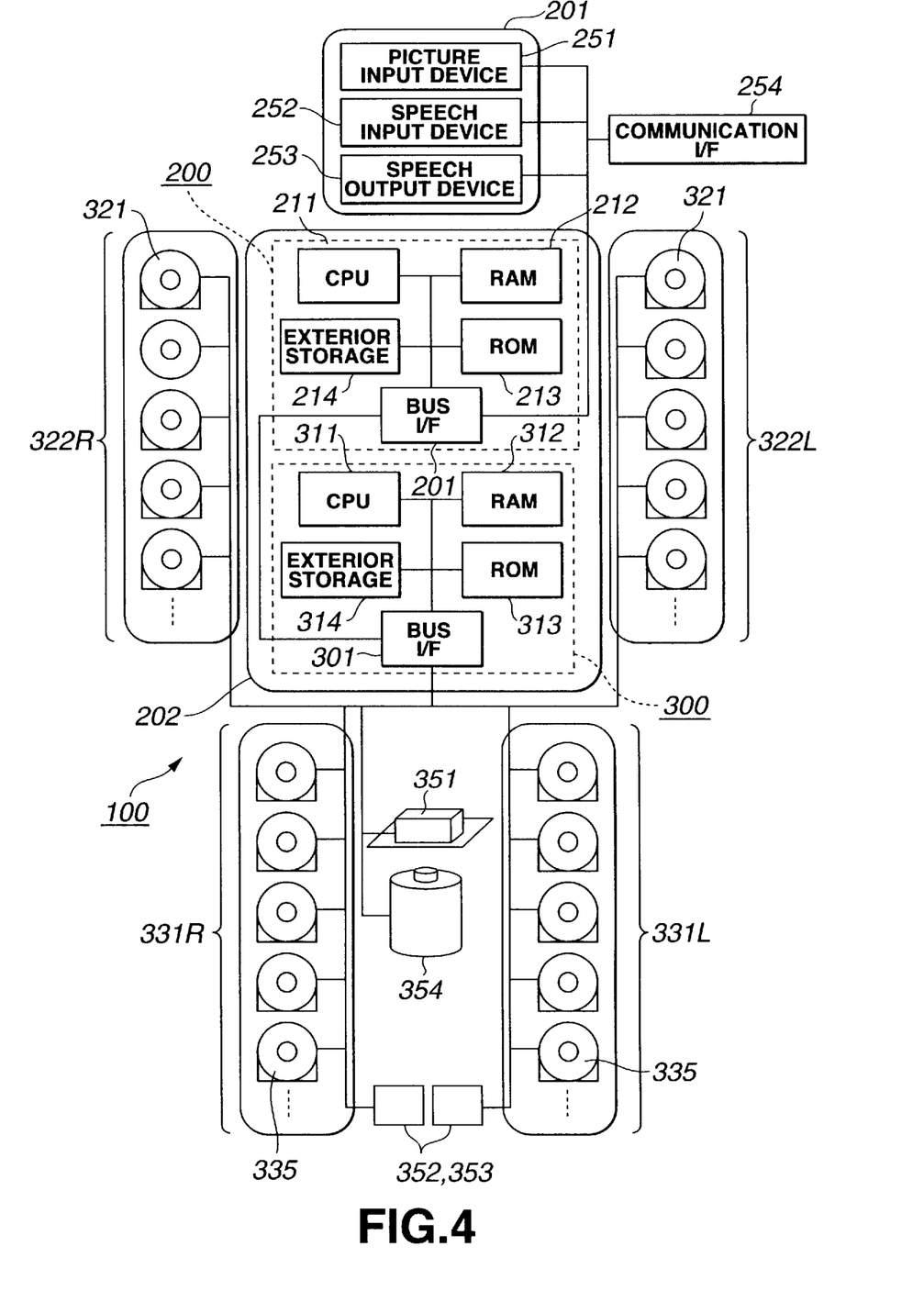
FIG. 4 schematically shows a control system of the legged mobile robot of the present invention.

FIG. 4 schematically shows a control system configuration of the legged mobile robot 100 according to the present invention. As shown therein, the control system is made up of a thinking control module 200, dynamically reacting to a user input to take charge of the sentiment judgment or feeling expression, and a movement control module 300 controlling the whole body concerted movement of the robot 100 such as driving of the joint actuator.

The thinking control module 200 is an independent information processing apparatus, comprised of a CPU (central processing unit) 211 for executing calculation processing concerning sentiment judgment or feeling expression, a RAM (random access memory) 212, a ROM (read-only memory) 213 and hard disc drive such as an exterior storage devices 214. The processing may be self-complete in the module 200. It is possible to store the walking pattern or other operational patterns calculated off-line, such as walking patterns, within the exterior storage devices 214.

To the thinking control module 200, there are connected, through a bus interface 201, a variety of units, including a picture input device 251, such as a CCD (charge-coupled device) camera provided in the head part 201, a speech input device 252, such as a microphone, a speech output device 253, such as a loudspeaker, or a communication interface 254 for effecting data exchange with a system outside the robot 100 through e.g., LAN (local area network), not shown.

The thinking control module 200 decides the current feeling or will of the legged mobile robot 100, in accordance with stimuli from the outside world or changes in the environment, such as pictures or visual data input from the picture input device 251 or speech or acoustic data input from the speech input device 252. The thinking control module 200 also issues a command to the movement control module 300 to implement the behavior or movement corresponding to the decision of will, that is movements of the four limbs 322R, 322L, 331R and 331L.

The movement control module 300 is comprised of a CPU (central processing unit) 311 for controlling the whole body concerted movements of the robot 100, a RAM (random access memory) 312, a ROM (read-only memory) 313 and an exterior storage devices 314 such as a hard disc drive. The processing may be self-complete within the module 300. The exterior storage devices 314 is able to store e.g., the behavioral pattern or the "walking capacity" employing the four limbs. The "walking capacity" is a technical term used in the related art to denote "chronological changes of the joint angle".

To the movement control module 300, there are connected, through a bus interface 301, a variety of devices, such as a joint actuator 321 for realizing respective degrees of freedom of the joints distributed in the whole body of the robot 100 (see FIG. 9), an orientation sensor 351 for measuring the orientation and the tilt of the body trunk 202, road surface contact sensors 361 and relative movement measurement sensors 362 provided on left and right feet and power source control devices for supervising the power source such as battery.

The movement control module 300 controls the whole body concerted movement by the joint actuators 321, 335 in order to implement the behavior commanded by the thinking control module 200. That is, the CPU 311 fetches the behavioral pattern corresponding to the behavior as commanded by the thinking control module 200 from the exterior storage device 314 or internally generates a movement pattern. The CPU 311 also sets the foot movement, ZMP (zero moment point) trajectory, body trunk movement, upper limb movement, and the horizontal waist position and height, in accordance with the specified behavioral pattern, while sending command values specifying the movements conforming to the as-set contents to the respective joint actuators.

The CPU 311 is able to adaptively control the whole body concerted movement of the legged mobile robot 100 by detecting the orientation or tilt of the body trunk part of the robot 100 by output signals of the orientation sensor 351 and by detecting whether the respective mobile legs are in the free state or in the erected state by output signals of the road surface contact sensors 361 of the left and right legs.

Moreover, the movement control module 300 is adapted for returning to which extent the behavior has been implemented up to the will determined by the thinking control module 200, that is the processing state, to the thinking control module 200. The thinking control module 200 and the movement control module 300 are constructed on a common platform and are interconnected over bus interfaces 201, 301.

The legged mobile robot 100 is adapted for recording the contents of a command issued by the user in combination with the behavior taken by the robot and the time of taking the behavior. Thus, the user is able to analyze the recorded contents later to search the abnormalities or malfunctions that occurred in the robot and the causes of such troubles. Additionally, the behavioral history of the robot, such as where, with whom and what the robot did during the time other than the time of the abnormalities, malfunctions and troubles, can be investigated. In the following, the recording management processing of the behavioral history or empirical information of the robot in the present invention is explained.

Figure 5:
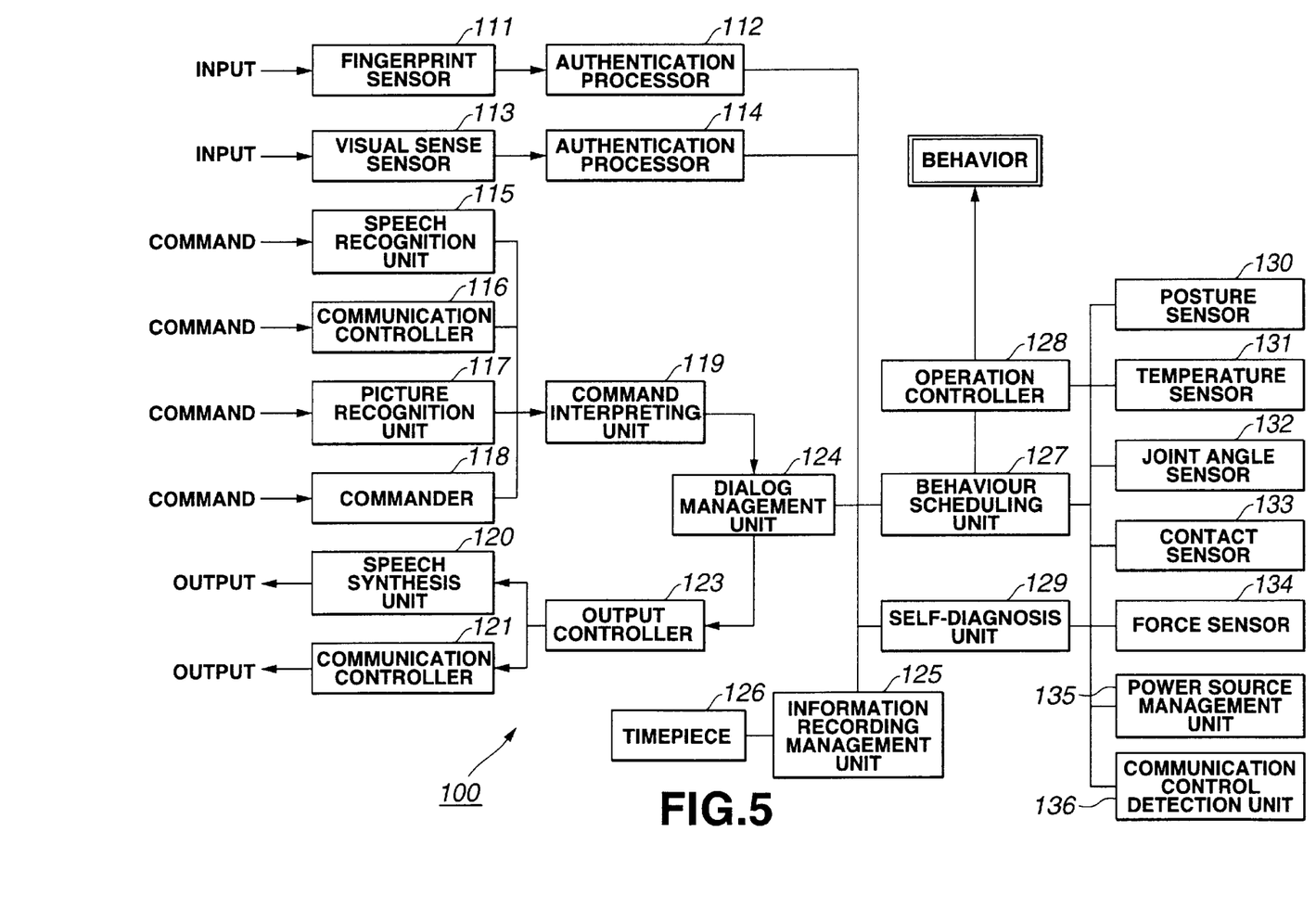
FIG. 5 is a block diagram showing a typical functional block structure for recording the behavioral recording or empirical information in the legged mobile robot of the present invention.

FIG. 5 shows a typical functional block for implementation of the behavioral recording or the empirical information in the legged mobile robot 100. The robot 100 shown in FIG. 5 is able to perform operations of the "dialog driving" type in which the robot sets a behavioral schedule such as to follow the dialog with the user based on the speech or image input.

For user authentication, the legged mobile robot 100 uses at least one of a fingerprint sensor 111 or a visual sensor 113.

As the visual sensor 113, the image input device 251, such as a CCD (charge coupled device) loaded on the head part may be used together. In this case, one or more face images of the registered user, images of other body parts of the user, or the feature information extracted from the images, are stored in advance. An authentication processor 114 processes e.g., the face images input from the visual sensor 113 and compares them to previously registered face images or the feature information for collation to effect authentication processing as to whether or not the user is an authorized user.

Although not shown in FIGS. 1 to 4, a fingerprint sensor 111 includes a fingerprint readout head on a site on which the user can easily touch with a finger, such as head part 104 or a shoulder part. One of more fingerprints of the registered user are previously stored as the authentication information. An authentication processor 112 performs image processing and feature extraction processing on the fingerprint information input from the fingerprint sensor 111, and compares the input fingerprint information to the pre-registered fingerprint for collation to effect authentication processing to determine whether or not the user is an authorized user.

Meanwhile, the Japanese Laying-Open Patent Publication H-3-18980 discloses a fingerprint collation device provided with a reference image memory holding image data of the reference fingerprint and an image input device inputting the image of the fingerprint to be authenticated and which collates the fingerprint as the two images are superposed together and checked for the degree of coincidence.

The fingerprint sensor 111 and the authentication processor 112 are able to perform more accurate authentication processing for the user who definitely requested fingerprint collation. On the other hand, the visual sensor 113 and the authentication processor 114 are able to perform authentication processing, in the absence of the request on the part of the user, with the user being not aware of it, as the user is tracked and imaged with a camera. The authentication processors 112, 114 are also able to transfer the results of authentication of the user to an information recording management unit 125.

In order for the user to input commands or data, the legged mobile robot 100 of the present invention furnishes four means, namely a speech recognition unit 115, a communication control unit 116, an image recognition unit 117 and a commander 118.

The speech recognition unit 115 is made up of a speech input unit 252, such as a microphone, a CPU 211 capable of recognizing and processing the speech, or other calculation processing circuit. The user is able to input commands, which are in natural language form or are abstruse, such as "run", "carry o∆" or "hurry up" by speech. The speech recognition unit 115 recognizes the user's speech. A command interpreting unit 119 comprehends and analyzes the command to the robot 100 based on the result of speech recognition.

The communication control unit 116 is made up of a communication interface 254, and a CPU 211 for processing the command or data exchanged through the communication interface 254 or other calculation processing circuits. The communication interface 254 is interconnected to an information terminal, such as a personal computer, through a Bluetooth or other wireless data communication network. The user is able to input the commands of the form that can be uniquely interpreted by an automated machine, such as a robot, or the commands of more abstruse form, at a console on such information terminal for transfer to the robot 100. The user command received by the communication control unit 116 is interpreted by the command interpreting unit 119 and thence transferred to a dialog management unit 124.

The image recognition unit 117 is made up of the image input device 251, such as a CCD camera, and a CPU 211, capable of image recognition processing or the like calculating circuit. The user is able to input a command such as gesture or hand movements. The image recognition unit 117 recognizes an images while the command interpreting unit 119 comprehends and analyzes the gesture or hand movements as a command based on the recognized result. The command may also be input nor by the gesture but by inputting the visible information, such as cyber-codes, uniquely assigned to the commands, as an image to input a command.

Although not shown in particular in FIGS. 1 to 4, the commander 118 is constructed as a key/button type user input device, loaded on the back or the belly of the legged mobile robot 100, or as a remote controller, not shown. The user can enter a command of a form that can be uniquely interpreted by a robot, or a command of more abstruse form, on the commander 118. The user command, input on the commander 118, is interpreted by the command interpreting unit 119 and thence sent to the dialog management unit 124.

The dialog management unit 124 chronologically manages the commands of variable forms, received through the command interpreting unit 119, to comprehend the context of the dialog with the user, as well as to maintain the dialog context. In the present embodiment, the dialog management unit 124 is able to transfer the contents of the dialog with the user to the information recording management unit 125. The dialog management unit 124 is also able to generate a reply to the user input in a speech synthesis unit 120 and subsequently outputs the reply to outside via a loudspeaker or outputs the reply at a console at e.g., an external computer system, such as a user terminal, through a communication controller 121 or as an image through a GUI.

The speech synthesis unit 120 is made up of a speech outputting unit 253, such as a loudspeaker, a CPU 211 that is able to synthesize the speech, or the like calculation circuit. The communication controller 121 is made up of a communication interface 254, a CPU 211, for processing commands or data exchanged over the communication interface 254, and other calculating circuits.

An orientation sensor 130, a temperature sensor 131, a joint angle sensor 132, a contact sensor 133, a force sensor 134, a power source management unit 135 and a communication controlling detection unit 136 are functional modules for detecting the outside field or environment of the robot 100, changes in such outside field or environment, and the state of operation implementation.

The orientation sensor 130 is equivalent to a reference numeral 354 in FIG. 4, and is able to detect the orientation of the robot 100 with respect to the robot 100. The joint angle sensor 132 is equivalent to the rotary encoder mounted in each joint actuator (see FIG. 3). The contact sensor 133 is equivalent to ground touching confirming sensors 352, mounted on the foot parts. Although not shown in FIGS. 1 to 4, the force sensor 134 is mounted in each part of the whole body of the robot 100 for detecting the possible conflict against the user or obstacles of the outer field.

The power source management unit 135 is equivalent to the reference numeral 354 in FIG. 4, and is designed to monitor the power source voltage, current or the power source capacity of the battery as a main power source of the robot 100. The communication controlling detection unit 136 is made up of a communication interface 254 and a CPU 211 or the like calculation circuit for processing commands or data exchanged over the communication interface 254, and detects changes in the outer field or the environment by the communication commands or communication data.

The environmental factors, prescribed by these sensors, are sent to a behavior scheduling unit 127 and to a self-diagnosis unit 129.

The behavior scheduling unit 127 sets a behavioral schedule for the robot 100, in accordance with the context of the dialog in the dialog management unit 124 or the outer field or the environment or the robot 100, prescribed by a sensor functional module 130, and commands an operation controller 128 to implement the behavior. According to the present invention, the behavior scheduling unit 127 is able to transfer the contents of the behavioral schedule to the information recording management unit 125.

The operation controller 128 issues operational commands, such as rotation or various speed commands, to the respective joint actuators (see FIGS. 3 and 4), in order to implement the behavior as instructed by the behavior scheduling unit 127. As a result, the scheduled or expected behavior of the robot 100 may be implemented. The rotational positions of the respective joint actuators are measured by the respective joint angle sensors 132 and used for feedback control.

The operation controller 128 may dynamically generate the operational pattern for implementing sequentially commanded actions in real-time. Alternatively, it may calculate the trajectory schedules for walking or other main operational patterns off-line at the outset. In the latter case, if a behavioral command is issued from the behavior scheduling unit 127, the operation controller 128 may call out the trajectory schedule of the corresponding main operational patterns to implement the behavior as it corrects the target trajectory as necessary. In the Japanese Laying-Open Patent Publication S-62-97006, there is disclosed a multi junction walking robot control apparatus which, by employing pre-stored walking pattern data, simplifies the control program and densely joins the data of the walking pattern together.

The self-diagnosis unit 129 effects self-diagnosis of the inner states of the robot 100, such as states of implementation of the scheduled behavior, abnormalities, malfunctions or troubles, based on the detection outputs of the sensors, such as the orientation sensor 130, temperature sensor 131, joint angle sensor 132, contact sensor 133, force sensor 134, power source management unit 135 and the communication controlling detection unit 136. The results of the self-diagnosis can be transferred to the information recording management unit 125.

The information recording management unit 125 is able to acquire the following items from various components:
(1) the user authentication information from the authentication processor 112 and/or from the authentication processor 114;
(2) the contents of the dialog managed by the dialog management unit 124 or the latest user command;
(3) the contents of the dialog or the user command and the behavioral schedule determined by the outer field or the environment; and
(4) the state of implementation of the behavioral schedule diagnosed by the self-diagnosis unit 129.

The information recording management unit 125 combines these data and also the current time furnished from a clock 126 for saving as the "behavioral history" or "empirical information", that is as behavior log.

The behavior log is retained in a non-volatile fashion in a local memory of the information recording management unit 125 or in a local disc, not shown. Alternatively, if the behavior log is stored in a memory device that can be inserted or removed like a cartridge, such as a memory stick, the behavior log may be dismounted from the robot 100 later for analyzing and processing the log on an external computer system.

The "behavioral history" or the "empirical information" stored in the information recording management unit 125 may be retrieved using the time information. Alternatively, the "behavioral history" or the "empirical information" may be acquired from the dialog with the robot 100 through e.g., the speech recognition unit 115.

Figure 6:
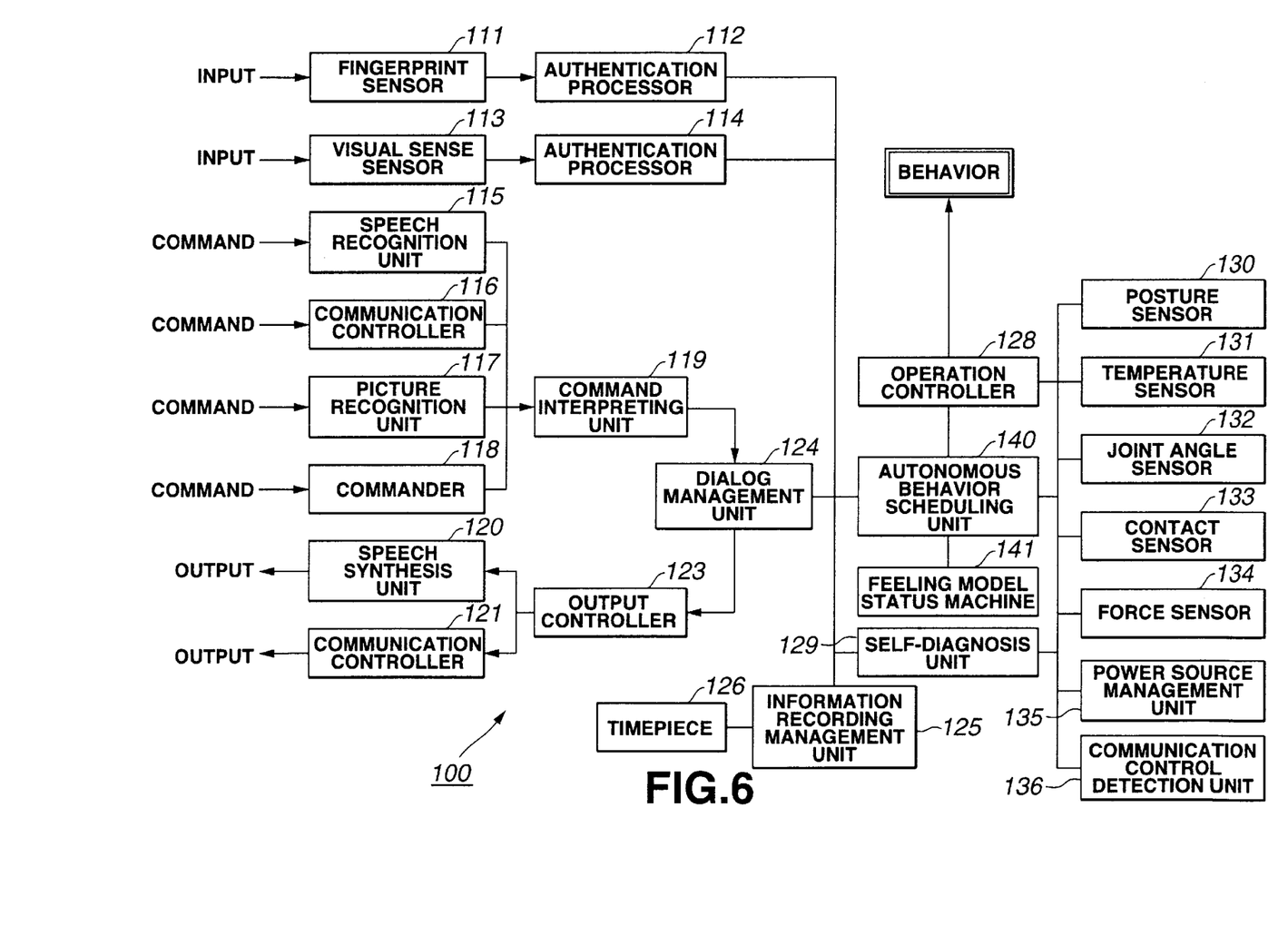
FIG. 6 is a block diagram showing another typical functional block structure for recording the behavioral recording or empirical information in the legged mobile robot of the present invention.

FIG. 6 shows another typical functional block structure for implementing the recording processing of the behavioral records or empirical information in the legged mobile robot 100. The robot 100, shown in FIG. 6, is able to perform the operation not only of the "dialogue driving" system, in which the behavioral schedule is set in accordance with the dialog with the user based on the input speech or image, but also of the "autonomous driving" in which the behavioral schedule is set autonomously without recourse to the dialog with the user.

The legged mobile robot 100 utilizes at least one of the fingerprint sensor 111 and the visual sensor 113 for user authentication. As the visual sensor 113, the image input device 251, such as a CCD (charge coupled device) loaded on the head part may be used. Although not shown in FIGS. 1 to 4, a fingerprint sensor 111 includes a fingerprint readout head on a site on the robot 100 on which the user can easily touch with a finger, such as head part 104 or a shoulder part.

The fingerprint sensor 111 and the authentication processor 112 are able to perform more accurate authentication processing for the user who definitely requested fingerprint collation. On the other hand, the visual sensor 113 and the authentication processor 114 are able to perform authentication processing, in the absence of the request on the part of the user, with the user being not aware of it, as the user is tracked and imaged with a camera. The authentication processors 112, 114 are also able to transfer the results of authentication of the user to an information recording management unit 125.

In order for the user to input commands or data, the legged mobile robot 100 of the present invention furnishes four means, namely a speech recognition unit 115, a communication control unit 116, an image recognition unit 117 and a commander 118.

The speech recognition unit 115 is made up of a speech input unit 252, such as a microphone, a CPU 211 capable of recognizing and processing the speech, or other calculation processing circuit. If the user inputs the speech, the speech recognition unit 115 recognizes the user's speech. The command interpreting unit 119 also comprehends and analyzes the command to the robot 100, based on the result of speech recognition.

The communication control unit 116 is made up of a communication interface 254, the CPU 211 issuing communication commands or processing data or the like calculating circuit. The communication interface 254 is interconnected over radio data communication network to exterior information terminals, such as personal computers. The communication control unit 116 receives and processes the commands transmitted from the user over the communication network. The received command is construed in the command interpreting unit 119 and subsequently transmitted to the dialog management unit 124.

The image recognition unit 117 is made up of the image input device 251, such as a CCD camera, and a CPU 211, capable of image recognition processing, or the like calculating circuit. The user is able to input a command such as gesture or hand movements. The image recognition unit 117 recognizes an image, while the command interpreting unit 119 comprehends and analyzes the gesture or hand movements as a command based on the recognized result.

The commander 118 is constructed as a key/button operable user input device, loaded on the legged mobile robot 100, or as a remote controller, not shown. The user can enter a command of a form that can be uniquely interpreted by a robot, or a command of more abstruse form, on the commander 118. The user command, input on the commander 118, is interpreted by the command interpreting unit 119 and thence sent to the dialog management unit 124.

The dialog management unit 124 chronologically manages the commands of variable forms, received through the command interpreting unit 119, to comprehend the context of the dialog with the user, as well as to maintain the dialog context. The dialog management unit 124 is able to transfer the contents of the dialog with the user to the information recording management unit 125. The dialog management unit 124 generates a reply to the user input in a speech synthesis unit 120 and subsequently outputs the reply to outside via a loudspeaker or outputs the reply through a communication controller 121 to an external computer system.

The speech synthesis unit 120 is made up of a speech outputting unit 253, such as a loudspeaker, a CPU 211 that is able to synthesize the speech, or the like calculation circuit. The communication controller 121 is made up of a communication interface 254, a CPU 211, for processing commands or data exchanged over the communication interface 254, and other calculating circuits.

An orientation sensor 130, a temperature sensor 131, a joint angle sensor 132, a contact sensor 133, a force sensor 134, a power source management unit 135 and a communication controlling detection unit 136 are functional modules for detecting the outside field or environment of the robot 100, changes in such outside field or environment and the state of operation implementation.

The orientation sensor 130 detects the orientation of the robot 100 with respect to the robot 100. The joint angle sensor 132 is equivalent to the rotary encoder mounted in each joint actuator. The contact sensor 133 is equivalent to ground touching confirming sensors 352, mounted on the foot parts. The force sensor 134 is mounted in each part of the whole body of the robot 100 for detecting the possible conflict against the user or obstacles of the outer field. The power source management unit 135 is designed to monitor the power source voltage, current or the power source capacity of the battery as a main power source of the robot 100. The communication controlling detection unit 136 is made up of a communication interface 254 and a CPU 211 or the like calculation circuit for processing communication commands or data exchanged over the communication interface 254, and detects changes in the outer field or the environment by the communication commands or communication data.

The environmental factors of the robot 100, defined by these sensors, are sent to an autonomous behavior scheduling unit 140 and to a self-diagnosis unit 129.

The autonomous behavior scheduling unit 140 determines a feeling model in a feeling model status machine 141, based on changes in the external environment, caused e.g., by input data from the above sensors, to set a behavioral schedule for the robot 100 autonomously to command the operation controller 128 to implement the behavior. The autonomous behavior scheduling unit 140 is also able to transfer the contents of the behavioral schedule to the information recording management unit 125. Meanwhile, in the specification of the JP Patent Application H-11-341374, already transferred to the present Assignee, there is disclosed a legged robot having an operation-related feeling instinct model, which feeling instinct model is varied based on the input information to control the operation.

For implementation of the behavior as commanded by the autonomous behavior scheduling unit 140, the operation controller 128 issues operational commands, such as rotation command or various speed commands, to the respective joint actuators. As a result, the scheduled or expected behavior of the robot 100 is implemented. The rotational positions of the respective joint actuators are measured by the respective joint angle sensors 132 and used for feedback control.

The operation controller 128 may dynamically generate operational patterns for implementing the sequentially commanded behaviors in real-time. Alternatively, the trajectory schedule for main behavioral patterns, such as walking, may be provided at the outset.

The self-diagnosis unit 129 effects self-diagnosis of the inner states of the robot 100, such as states of implementation of the scheduled behavior, abnormalities, malfunctions or troubles, based on the detection outputs of the sensors, such as the orientation sensor 130, temperature sensor 131, joint angle sensor 132, contact sensor 133, force sensor 134, power source management unit 135 and the communication controlling detection unit 136. The results of the self-diagnosis can be transferred to the information recording management unit 125.

The information recording management unit 125 is able to acquire the following items from various components:
(1) the user authentication information from the authentication processor 112 and/or from the authentication processor 114;
(2) the contents of the dialog managed by the dialog management unit 124 or the latest user command;
(3) the behavioral schedule determined by the autonomous behavior scheduling unit 140 in accordance with the feeling model; and
(4) the state of implementation of the behavioral schedule diagnosed by the self-diagnosis unit 129.

The information recording management unit 125 combines these data and also the current time furnished from a clock 126 for saving as the "history of behavior" or "empirical information", that is as behavior log.

The behavior log is retained in a non-volatile fashion in a local memory of the information recording management unit 125 or in a local disc, not shown. Alternatively, if the behavior log is stored in a memory device that can be inserted or removed like a cartridge, such as a memory stick, the behavior log may be dismounted from the robot 100 later for analyzing and processing the log on an external computer system.

If both the "dialogue driving" system, in which the behavioral schedule for the robot 100 is set in accordance with the dialog with the user based on the speech or image input, and the "autonomous driving" system, in which the behavioral schedule is set autonomously without recourse to the dialog with the user, are to be supported, the discrimination information indicating whether the behavioral schedule is of the dialogue driving type or the autonomous driving type may be recorded together.

The "behavioral history" or the "empirical information" stored in the information recording management unit 125 can be retrieved using the time information. Alternatively, it can be derived from the dialog with the robot 100 through e.g., the speech recognition unit 115.

Figure 7:
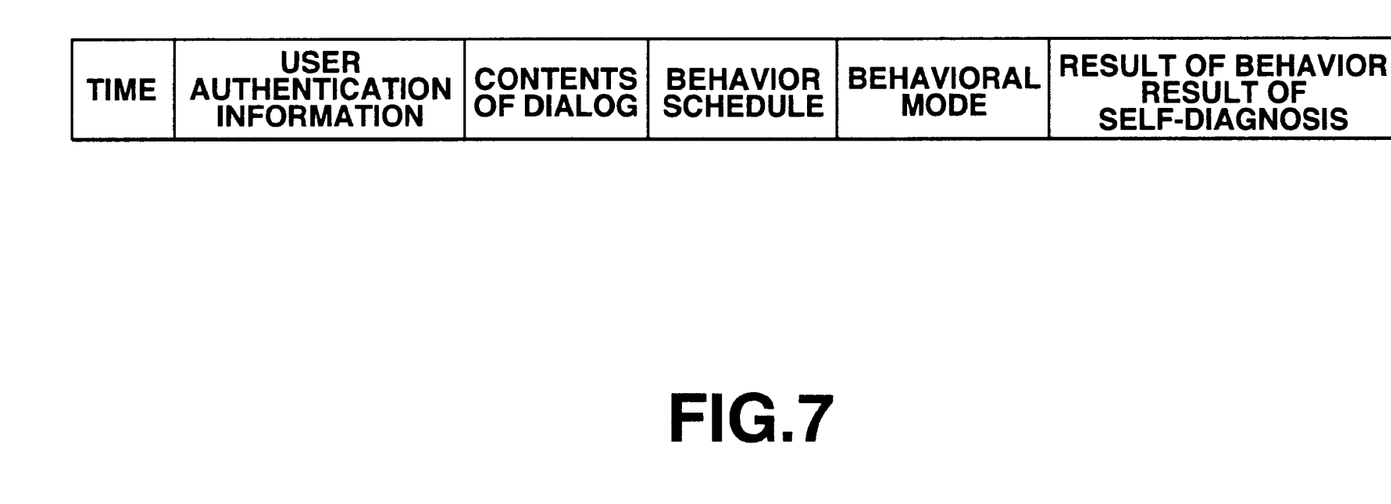
FIG. 7 shows a typical data format of an behavior log.

FIG. 7 shows a data format of the behavior log. As shown therein, each log is made up of a time field, a user authentication information field, a dialog contents field, a behavioral schedule field, an action mode field, and a result of behavior—result of self-diagnosis field.

The actual time supplied from the clock 126 is written in the time field. In the user authentication information field is written the user information, authenticated by the fingerprint sensor 111 and authentication processor 112 or by the visual sensor 113 and the authentication processor 114. The authenticated user may be an originator of the command on the dialog process. In the dialog contents field are written the dialog contents supervised by the dialog management unit 124.

In the behavior schedule filed is written the behavioral schedule as set by the behavior scheduling unit 127 or the autonomous behavior scheduling unit 140. In the action mode field is written the information for discriminating with which of the dialog driving system and the autonomous driving system the current behavioral schedule of the robot 100 has been set.

In the result of behavior—result of self-diagnosis field is written the state of operation implementation, as calculated based on the output of each joint angle sensor 132 or the result of self-diagnosis, as determined based on outputs of other sensors, such as malfunction state.

It should be noted that the analysis of the behavior log inclusive of the above data leads to estimation of the behavior of the robot 100 and causes of abnormalities, accidents or troubles.

Figure 8:
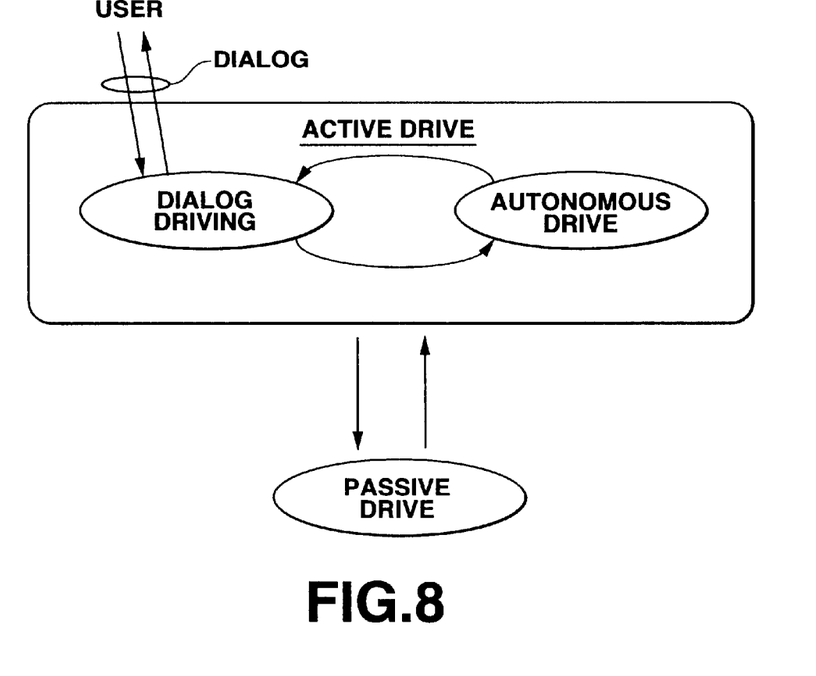
FIG. 8 shows an operating state that can be taken by the robot of the present invention.

FIG. 8 shows the state of actions that can be taken by the robot 100 of the present invention. As shown therein, the robot 100 of the present invention can take the states of active driving and passive driving.

In the passive driving, the robot receives commands, interpreted unequivocally, from the user, and implements the operation only in accordance with the commands, while the inner states, such as thinking or feeling, proper to the robot 100, are not active.

For example, such driving state in which a pre-stored walking pattern is read out responsive to the user's command "walk" to implement the walking movement corresponds to the passive driving. In this case, although the control function of the robot 100 performs correction of the target trajectory accompanying stable orientation control or disturbances, the thinking or feeling is not in operation, such that the dialog with the user is not valid or is not needed.

Thus, in the passive driving state, the input command is directly written in the dialog contents field of the behavior log shown in FIG. 7. Since the robot 100 itself does not set a behavioral schedule, blank or default values are written in the behavioral schedule field. In the result of behavior—result of self-diagnosis field is written the state of operation implementation, as calculated based on the output of each joint angle sensor 132, or the result of self-diagnosis, as determined based on outputs of other sensors, such as malfunction state.

In the active state, there are two operating states, namely the "dialog driving" system of setting the behavioral schedule in compliance with the dialog with the user, based on an audio or image input, and the "autonomous driving" system of autonomously setting the behavioral schedule without recourse to the dialog with the user.

The robot 100 may operate in accordance with one of the dialog driving system and the autonomous driving system. Alternatively, the two driving systems may be changed over unidirectionally or bidirectionally. For example, transition may be made to the autonomous driving system subject to occurrence of a preset event, such as time elapsed as from the last user input or the from the last dialog, or reversion may be made to the dialog driving system subject to the next user input or to the occurrence of the next dialog.

Figure 9:
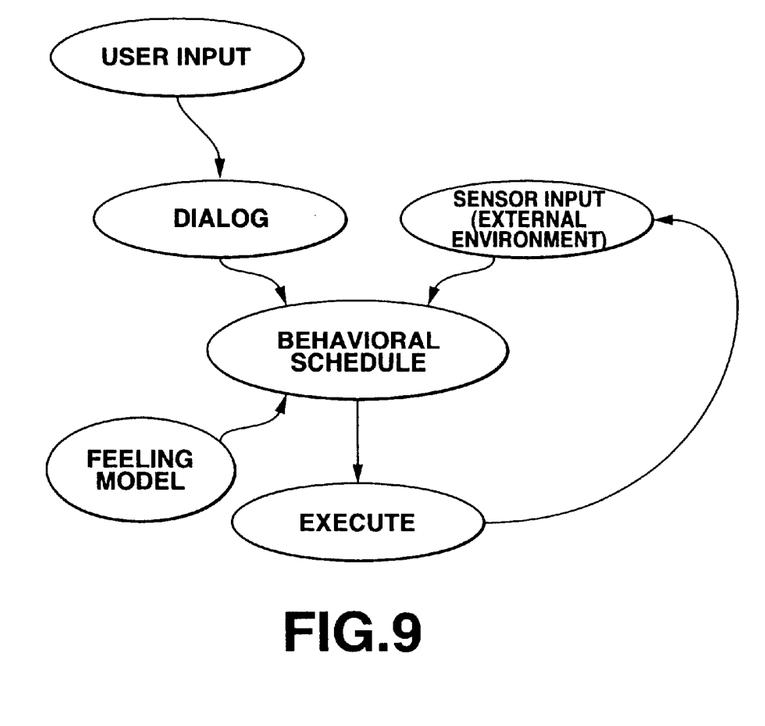
FIG. 9 schematically shows an operational sequence of a robot during active driving.

FIG. 9 schematically shows the operational sequence of the robot 100 during active driving.

If, during dialog driving, a user input is made, this is recognized and interpreted as a command for dialog control. The user who makes the dialog is authenticated through a fingerprint sensor or visual sensor. A behavioral schedule is set based on the contents of the dialog and the outside environment, input from the sensor, to implement the behavioral pattern corresponding to the behavior. The state of implementation of the behavioral pattern is obtained by a sensor input.

Thus, in the dialog driving state, the authentication information concerning the user making a dialog with the robot 100 is written in the user authentication information field in the behavior log shown in FIG. 7. In the behavior contents field are written the contents of the dialog established between the robot and the user. In the behavioral schedule field, the behavioral schedule as set for the robot 100 depending on the contents of the dialog or responsive to changes in the outside environment. In the operation mode field, the discrimination information testifying to the dialog driving state is written in the operational mode field. In the result of behavior—result of self-diagnosis field is written the state of operation implementation, as calculated based on the output of each joint angle sensor 132, or the result of self-diagnosis, as determined based on outputs of other sensors, such as malfunction state.

In the autonomous driving, the user input is interrupted, or the user input is not accepted, so that the dialog with the user is not valid. In such case, the robot 100 autonomously sets the behavioral schedule, based on changes in the outside environment, input from the sensor, and on the feeling model, without recourse to the dialog with the user. The operational pattern corresponding to the behavior is implemented, and the state of implementation of the operational pattern is obtained based on the sensor input. During the autonomous driving, the near-by user is not the command originator, so that user authentication may or may not be performed.

Thus, during the autonomous driving state, the authentication information of the near-by user is written in the user authentication information field, or the blank or default value may be in the field. In the dialog contents field is directly written the input command. In the behavioral schedule is written the behavioral schedule determined by the robot 100 responsive to the feeling model or to changes in the outside environment. In the operation mode field is written the discrimination information testifying to the dialog driving state. In the result of behavior—result of self-diagnosis field is written the state of operation implementation, as calculated based on the output of each joint angle sensor 132, or the result of self-diagnosis, as determined based on outputs of other sensors, such as malfunction state.

It should be noted that the analysis of the behavior log inclusive of the above data leads to estimation of the behavior of the robot 100 and causes of abnormalities, accidents or troubles, regardless of which of the driving states shown in FIG. 8 is assumed by the robot 100.

Although the present invention has been elucidated with reference to several preferred embodiments, it is to be noted that those skilled in the art can modify the embodiments or use technical equivalents without departing from the scope of the invention.

The foregoing des is merely illustrative and should not be construed in a limiting fashion. The purport of the present invention can be best understood by having reference to the claims.

INDUSTRIAL APPLICABILITY

According to the present invention, as described above, there may be provided a behavioral schedule setting type robot of superior quality which is able to set a behavioral schedule in compliance with the dialog with the user based on an audio or image input or to autonomously set a behavioral schedule without recourse to a user input.

There may also be provided a behavioral schedule setting type robot of superior quality which is able to search into a cause of abnormalities, malfunctions or troubles in which the robot is involved during "dialog driving" or "autonomous driving".

The robot of the present invention is able to authenticate a user who issues a command to the robot. The robot of the present invention also extracts the biological feature information, such as the face or voice of the user who cannot be authenticated, or records the contents of the command issued from the user in combination with the behavior taken by the robot responsive to the command and the time of implementation of the behavior. The inner state of the robot as well as the sensor input information can also be recorded in combination. As a result, the user is able to search into the cause of the abnormalities, malfunctions or troubles that occurred in the robot by analyzing the recorded contents.

What is claimed is:

1. A controlling apparatus for a robot of a type formed by a plurality of joint actuators and operating in accordance with a behavioral schedule, comprising:

a behavior scheduling unit for setting the behavioral schedule of the robot;

an operation controller for implementing an operational pattern corresponding to the behavioral schedule determined by said behavior scheduling unit by driving each of the joint actuator;

a detector for detecting a state of operation implementation by said operation controller; and a recording unit for recording a log including the behavioral schedule by said behavior scheduling unit and the state of operation implementation by said detector.

2. The controlling apparatus for the robot according to claim 1 further comprising:

a user input unit for receiving a command or data from a user, and a dialog management unit for supervising a dialog with the user based on user input command or data from said user input unit, wherein said behavior scheduling unit sets the behavioral schedule in accordance with contents of the dialog in said dialog management unit, and said recording unit takes a log of the dialog contents.

3. The controlling apparatus for the robot according to claim 1 further comprising a self-diagnosis unit for diagnosing each part of the robot, wherein said recording unit takes the log of results of a self-diagnosis.

4. The controlling apparatus for the robot according to claim 1 further comprising a user authentication unit for authenticating a user lying in a vicinity of the robot, wherein said recording unit takes a log of results of user authentication.

5. The controlling apparatus for the robot according to claim 1, wherein said behavior scheduling unit sets the behavioral schedule based on a feeling model as determined in response to external changes.

6. The controlling apparatus for the robot according to claim 1, wherein said behavior scheduling unit is operable in accordance with a first operating system of setting the behavioral schedule based on the dialog with the user or in accordance with a second operating system of setting the behavioral schedule based on the feeling model as determined in response to the external changes, and said recording unit takes a log of the operating systems in said behavior scheduling unit.

7. A controlling method for a robot of a type formed by a plurality of joint actuators and operating in accordance with a behavioral schedule, comprising:

a behavior scheduling step of setting the behavioral schedule of the robot;

an operation controlling step of implementing an operational pattern corresponding to the behavioral schedule determined by said behavior scheduling step by driving each joint actuator;

a detecting step of detecting a state of operation implementation by said operation controlling step; and a recording step of recording a log including the behavioral schedule by said behavior scheduling step and the state of operation implementation detected by said detecting step.

8. The controlling method for the robot according to claim 7 further comprising:

a user input step of receiving a command or data from a user, and a dialog management step of supervising a dialog with the user based on the user input command or data from said user input step, wherein said behavior scheduling step comprises a step of setting the behavioral schedule in accordance with contents of the dialog in said dialog management step, and said recording step comprise a step of taking a log of the dialog contents.

9. The controlling method for the robot according to claim 7 further comprising a self-diagnosis step of diagnosing each part of the robot, wherein said recording step comprise a step of taking the log of results of the self-diagnosis.

10. The controlling method for the robot according to claim 7 further comprising a user authentication step of authenticating a user lying in a vicinity of the robot, wherein said recording step comprise a step of taking a log of the results of user authentication.

11. The controlling method for the robot according to claim 7 wherein said behavior scheduling step comprise a step of setting the behavioral schedule based on a feeling model determined in response to external changes.

12. The controlling method for the robot according to claim 7 wherein said behavior scheduling step is operable in accordance with a first operating system of setting the behavioral schedule based on the dialog with the user or in accordance with a second operating system of setting the behavioral schedule based on the feeling model determined in response to the external changes, and said recording step comprises a step of taking a log of the operating systems in said behavior scheduling step.

* * * * *